United States Patent

Sauer et al.

[11] 3,898,784
[45] Aug. 12, 1975

[54] BEAM SPLICE CONNECTION

[75] Inventors: Gale E. Sauer; Conrad Christel, both of Williamsville, N.Y.

[73] Assignee: Roblin Hope's Industries, Inc., Buffalo, N.Y.

[22] Filed: Feb. 20, 1973

[21] Appl. No.: 334,049

[52] U.S. Cl............... 52/758 A; 52/726; 403/364; 403/393
[51] Int. Cl.² ........................................ F16B 7/22
[58] Field of Search .......... 403/326, 364, 376, 393; 52/758 A, 726, 664

[56] References Cited
UNITED STATES PATENTS

| 3,221,466 | 12/1965 | Downing et al.............. | 52/758 A |
| 3,565,474 | 2/1971 | Stumbo et al................ | 52/758 A |
| 3,584,904 | 6/1971 | Lickliter...................... | 52/664 X |

Primary Examiner—Richard J. Scanlan, Jr.
Assistant Examiner—Wayne L. Shedd
Attorney, Agent, or Firm—Christel & Bean

[57] ABSTRACT

A splice connection between support members comprising an integral tongue on each member having a tab insertable into an opening cut out of the other member. A finger projecting into the opening bears against the tab to frictionally hold the tab in place. Detents on opposed faces of the assembled tongues are interlockingly engaged to secure the support members in the assembled relation.

11 Claims, 5 Drawing Figures

PATENTED AUG 12 1975 3,898,784
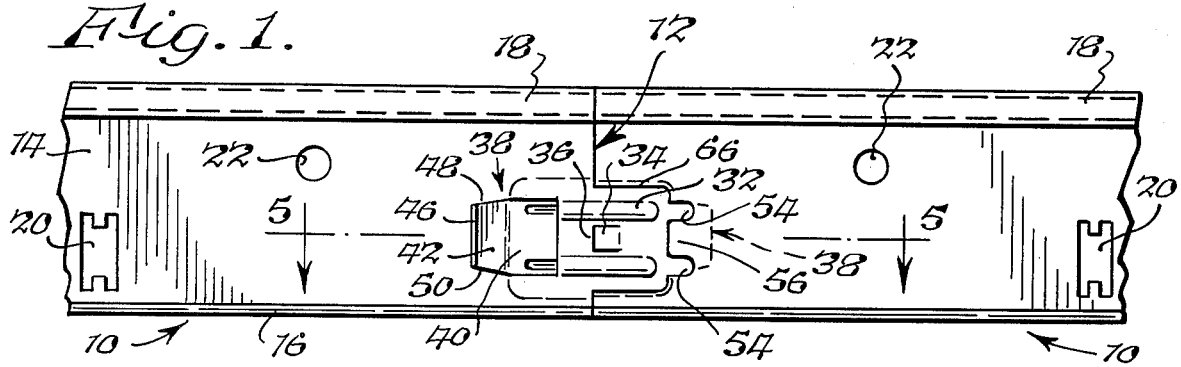
Fig. 1.
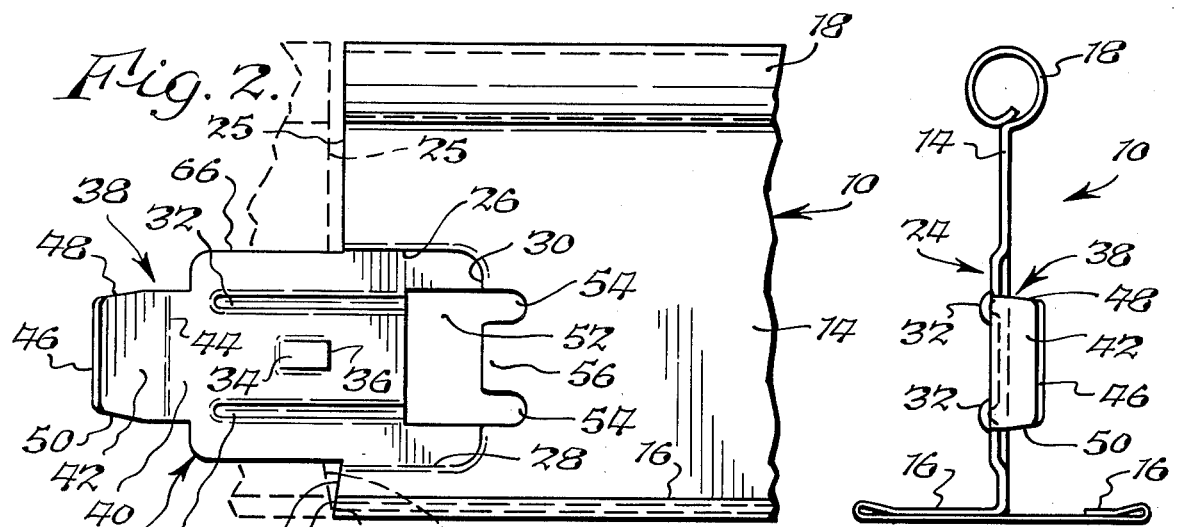
Fig. 2.
Fig. 3.
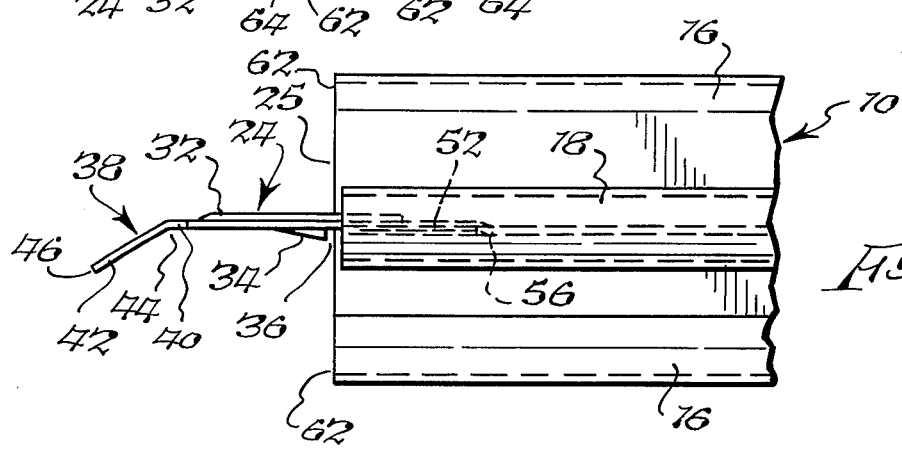
Fig. 4.
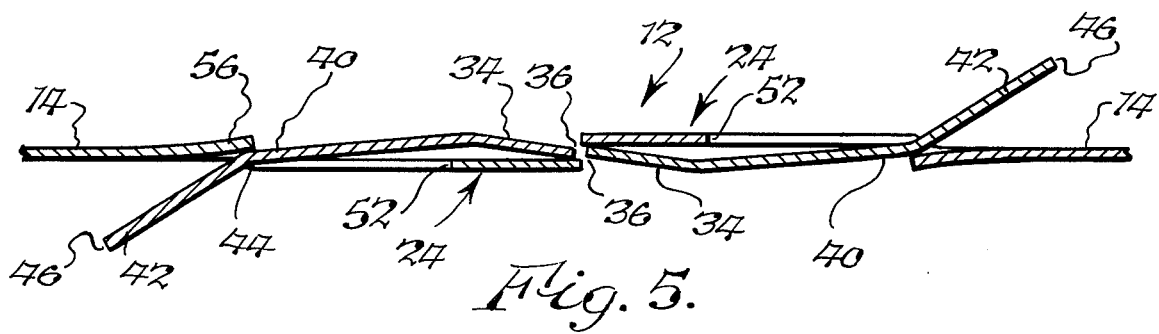
Fig. 5.

BEAM SPLICE CONNECTION

BACKGROUND OF THE INVENTION

This invention relates generally to tile supporting grid systems and the like and, more particularly, to splice means for interlocking adjacent grid members in an abutting end-to-end relation.

The present invention is particularly adapted for use in ceiling tile supporting grid systems of the type comprising a plurality of parallel spaced main grid members and parallel spaced cross grid members extending transversely between the main grid members. Such interconnected grid members conventionally are suspended from a ceiling or an overhead support structure.

It is often desirable to connect adjacent main grid members together in an axial end-to-end relation to extend the effective length of the main grid support members, as dictated by a specific application.

While splice arrangements have been devised for connecting two main grid members in an end-to-end relation, many of these known splice arrangements are intended to form relatively permanent connections whereby portions thereof are permanently deformed or, if intended to be detachable for reuse and replacement, often lack the stability and rigidity necessary for a satisfactory support. Sometimes, there is play in the connection between adjacent grid members, resulting in a loose and weakened joint. Often, additional reinforcing components are utilized, adding materially to the cost of installation.

SUMMARY OF THE INVENTION

Accordingly, an object of the present invention is to obviate the above noted disadvantages by providing an improved splice connection for interlocking adjacent grid members in an end-to-end relation in a simple and improved manner.

Another object of this invention is to provide an improved splice connection between adjacent grid members possessing the requisite stability and strength while being quickly and easily assembled and dismounted without the use of any additional components.

In one aspect thereof, the splice connection of this invention is characterized by the provision of an integral offset tongue on each grid member having a laterally projecting end portion insertable into an opening formed in the other grid member. A finger projects into the opening for resiliently bearing against such end portion to form a tight, rigid connection. Detents on opposed faces of the side-by-side related tongues are interlockingly engaged for locking the grid members in an assembled relation.

The foregoing and other objects, advantages and characterizing features of the present invention will become clearly apparent from the ensuing detailed description of an illustrative embodiment thereof, taken together with the accompanying drawing wherein like reference characters denote like parts throughout the various view.

BRIEF DESCRIPTION OF THE DRAWING FIGURES

FIG. 1 is a side elevational view of an assembled splice connection of this invention, the spliced grid members being broken away for ease of illustration;

FIG. 2 is an enlarged, fragmentary side elevational view of an end portion of one grid member, showing its relation to an adjacent grid member when assembled;

FIG. 3 is a fragmentary and elevational view of the grid member end portion of FIG. 2;

FIG. 4 is a fragmentary top plan view of the grid member end portion of FIG. 2; and FIG. 5 is a horizontal sectional view, on an enlarged scale, taken about on line 5—5 of FIG. 1.

DETAILED DESCRIPTION OF AN ILLUSTRATIVE EMBODIMENT

Referring now in detail to the illustrative embodiment depicted in the accompanying drawings, there is shown in FIG. 1 a pair of tile supporting beams or grid members 10 joined in an end-to-end relation by a splice connection, generally designated 12, comprised of axial extensions formed integral with grid members 10, as will hereinafter appear. Since both grid members are identical in construction, it is believed that a detailed description of one grid member only will suffice.

Each grid member 10 is of a generally inverted T form and can be conveniently fabricated from a single piece of any suitable material, preferably an inexpensive, lightweight metal such as soft steel for example, and is formed to provide a generally vertical web 14 upstanding from laterally projecting, tile supporting flanges 16 on opposite sides thereof and surmounted by a generally bulbuous-shaped, longitudinally extending, reinforcing member or bead 18. It should be appreciated that reinforcing beads 18 can take various shapes in transverse cross-section, such as a flat horizontal strip, a reinforced vertical edge having a double web thickness, or a flat-sided box shape, as desired.

Web 14 is provided at spaced intervals therealong with rectangular, normally vertically extending slots 20 for receiving locking connectors of cross grid members, not shown, which extend at right angles to grid members 10 to form a supporting grid system, also not shown. While slots 20 are shown as being H-shaped in the illustrative embodiment, it should be understood that slots 20 may take any shape compatible with the end portions of the cross grid members for receiving the same with a friction fit. Also, a plurality of openings 22 are provided at spaced intervals along web portion 14 adjacent bead 18 to receive cords or tie fasteners for suspending grid members 10 from an overhead supporting structure.

In accordance with this invention, grid members 10 are identical in construction and each is provided at its opposite ends with connecting means comprising tongues, generally designated 24, extending axially beyond the extremities 25 of web 14 and formed integral therewith. These tongues 24 are slightly laterally offset from the plane of web 14 in parallel relation thereto and in opposite directions from each other. Each tongue 24 is joined to web 14 along upper and lower marginal edges 26 and 28 and an inner marginal edge 30. A pair of parallel, vertically spaced ribs 32 are formed in each tongue 24 and extend longitudinally thereof in an axial direction. Ribs 32 project laterally outwardly in a direction away from web 14 and provide mechanical reinforcement and additional rigidity for the cantilevered tongues 24. An interlocking detent 34 having a flat locking edge in the form of an abutment shoulder 36 is struck out from tongue 24 intermediate ribs 32 and projects laterally outwardly from the plane of tongue 24 in a direction opposite to ribs 32.

Each tongue 24 is provided with an axially extending tab 38 formed integral therewith and having a generally straight vertical portion 40 projecting forwardly of tongue 24 and disposed in the same plane as the latter and an angularly related end portion 42 bent laterally inwardly from straight portion 40 along a vertical fold line 44 to extend in a direction away from ribs 32. Portion 42 terminates in a flat edge 46 and is provided with upper and lower inwardly tapered edges 48 and 50 to facilitate insertion of tab 38 into an opening formed in the other connected grid member 10, as will presently appear.

A cut-out section or opening 52 is formed adjacent the rear end of each tongue 24 for receiving tab 38 of the other grid member 10. As shown in FIG. 2, opening 52 is provided with a pair of vertically spaced notches 54, which extend axially into web 14 and define therebetween a flat tab engaging finger 56 lying in the plane of web 14. Finger 56 bears against tab 38 of the other grid member 10, and when grid members 10 are assembled in an end-to-end relation, finger 56 exerts an inwardly directed bias force against such tab 38 to firmly secure the two grid members 10 in the assembled relation. In the fully assembled relation shown in FIG. 5, finger 56 is only slightly sprung out of the plane of its respective web portion 14 and provides a spring bias urging tongue 24 of the other grid member 10 against its associated tongue 24.

In assembling a pair of grid members 10 in an end-to-end relation, the adjacent ends of the members are brought into substantial axial alignment with the confronting tongues 24 being laterally offset in opposite directions from each other. Tab end portion 42 of each grid member 10 is inserted into opening 52 of the other grid member 10 so that tongue 24 of members 10 extend side-by-side with detents 34 engaging each other and finger 56 of each member 10 engaging or about to engage the tab end portion 42 of the other member adjacent fold line 44. Tab end portions 42 are easily inserted into their associated openings 52 by virtue of tapered edges 48 and 50.

Upon the application of axial pressure to move grid members 10 toward each other into fully assembled relation, the inclined tab end portions 42 slide against the ends of the respective fingers 56 further into opening 52. As this happens, fingers 56 are sprung laterally to an extent permitting detents 34 to pass each other whereupon the restoring spring force of fingers 56 moves tongues 24 toward each other, holding detents 34 in interlocking engagement behind each other. As detents 34 move past each other, they snap into interlocking engagement of abutment shoulders or locking edges 36 behind each other as shown in FIG. 5, preventing withdrawal of grid members 10 away from each other. Also, fingers 56 remain slightly sprung, as shown in FIG. 5, resiliently bearing against the rear sides of tabs 38 to firmly secure grid members 10 in snugly assembled relation.

As shown in FIG. 2, flanges 16 terminate in end portions 62 defining stops adapted to abut in the assembled relation of grid members 10. Thus, when fully assembled, flange end portions 62 of grid members 10 abut to prevent relative movement of such members toward each other, while the abutment shoulders 36 of detents 34 are interlocked in a manner preventing separation or relative movement of grid members 10 away from each other.

As shown in FIG. 2, portions of web terminal ends 25 above tongues 24 are slightly spaced from each other in the assembled relation of grid members 10. Also, the lower portions of terminal ends 25 are inclined inwardly from flanges 16 to the bottom of tongue 24, as shown at 64 in FIG. 2. These clearances between the adjacent terminal ends 25 of grid members 10 preclude any possible interference thereof with the flush fit between the abutting flange end portions 62, which engage each other for substantially the full width of flange 16 to prevent lateral rocking of members 10 relative to each other. The tight friction fit between the upper and lower edges of tab 38 with the upper and lower edges defining opening 52, together with the flush fit between flange end portions 62, preclude vertical rocking movement of grid members 10 relative to each other. Moreover, the outer peripheral outline of the projecting portion 66 of each tongue 24 is snugly received in a complementary depression defined in the other web 14 by the tongue defining marginal edges 26, 28 and 30 formed in such web 14 during the formation of its respective tongue 24. This, together with the interlocking arrangement provided by detents 34 and the bearing pressure of fingers 56 against tab 38 produces a tight splice connection which is strong, stable and rigid in use.

In order to disconnect grid members 10, pressure is applied by hand to both webs 14 in opposite lateral directions to displace detents 34 in opposite directions until abutment shoulders 36 disengage and are free of each other. Fingers 56 yield resiliently to accommodate this. With abutment shoulders 36 disengaged, tabs 38 are easily withdrawn from openings 52 thereby disconnecting grid members 10 from each other. Thus, tongues 24 along with tabs 38, fingers 56 and detents 34 provide a strong and rigid, snap-type connection which is easily assembled, by a simple linear insertion of tabs 38 through openings 52 and which is readily disassembled as described above. It is not necessary to tilt or rock grid members 10 in order to assemble them. Only a simple, straight-line axial motion is required. It will be appreciated that the end of grid member 10 not shown in FIG. 2 corresponds to the adjacent end of the other grid member, shown in phantom in FIG. 2, for connection to still another grid member.

From the foregoing, it is apparent that the objects of the present invention have been fully accomplished in providing a splice connection which is readily assembled, can be easily disassembled if desired, and which is strong and rigid in use. The interengaging tabs and fingers and interlocking detents ensure a tight, rigid joint in the assembled relation.

A preferred embodiment of this invention having been disclosed in detail, it is to be understood that this has been done by way of illustration only.

We claim:

1. A splice connection comprising: at least two coaxially aligned beam members each having a web, connecting means on adjacent ends of said webs splicing said members in an end-to-end relation, said connecting means comprising a tongue extending beyond the end of each of said webs in a plane laterally offset from its respective web and parallel thereto, a tab extending axially outwardly from each of said tongues and laterally from the plane of said tongue in the general direction of said web, each of said webs having an opening provided therein axially spaced from said ends through which the tab of the other tongue is axially received said openings having a verticle dimension which is substantially equal to the maximum vertical dimension of said tabs, and a finger formed integrally in each of said webs and extending axially toward said adjacent beam end into each respective said opening in bearing engagement against said received tongue of the other web each of said beam members being provided with longitudial flange means extending laterally from its respective web and terminating in an end abutting the end of the flange means of the other member to prevent axial movement of said members toward each other, and means interlocking said tongues together in an assembled relation preventing relative movement of said members away from one another.

2. A connection according to claim 1 wherein said interlocking means comprises a laterally projecting detent struck out of each tongue in a direction toward the respective web for snap-fit interlocking engagement with each other.

3. A connection according to claim 1 including a pair of vertically spaced reinforcing beads formed for each tongue.

4. A connection according to claim 1 wherein said laterally projecting tab is provided with opposite tapered edges tapering inwardly toward each other and terminating in a substantially straight edge.

5. A connection according to claim 1 wherein each of said tabs includes a first portion extending axially outwardly from said tongue and formed integral therewith and a laterally projecting end portion being angularly related to said first portion and formed integral therewith.

6. A connection according to claim 1 wherein said fingers are sprung laterally by said tongues and resiliently bear thereagainst.

7. A connection according to claim 1 wherein said tabs each include an upper and a lower edge, said openings are each partially defined by an upper and a lower edge, and wherein said upper and lower tab edges engage said upper and lower opening edges in a tight friction fit to prevent any vertical movement of said beam members relative to each other.

8. A supporting beam member comprising: a web portion, a tongue formed integral with said web portion and projecting beyond the end of said web portion and disposed in a plane laterally offset from and parallel to the plane of said web portion, a tab formed integrally with the distal end of said tongue and having an end portion projecting laterally out of the plane of said tongue in a direction toward the plane of said web portion, said tongue having an opening formed therein, axially spaced from said distal end thereof said opening having a vertical dimension which is substantially equal to the maximum vertical dimension of said tab, a finger formed integral with said web and extending into said opening in a manner adapted for axial reception and locking in said opening of a corresponding but oppositely directed tab of another supporting beam member received in said opening, said finger adapted to bear against said corresponding but oppositely directed tab of another supporting beam member received in said opening, said beam member further being provided with longitudinal flange means extending laterally from its respective web and terminating in an end adapted for abutting the end of the flange means of another beam member for preventing axial movement of beam members toward each other when connected, and means adapted for interlocking said tongue in an assembled relation when received in the opening of another beam member for preventing relative movement of connected members away from one another.

9. A beam member according to claim 8 wherein said tab includes a first portion extending axially outwardly from said tongue and disposed in a common plane therewith, said laterally projecting end portion of said tab being angularly related to said first portion and formed integral therewith.

10. A beam member according to claim 9 wherein said tab end portion is provided with opposite tapered edges for easy insertion into a corresponding opening in another grid member.

11. A beam member according to claim 8 including a detent projecting outwardly from said tongue toward the plane of said web portion for snap-fit interlocking engagement with a corresponding but oppositely directed detent of another grid member.

* * * * *

UNITED STATES PATENT OFFICE
CERTIFICATE OF CORRECTION

PATENT NO. : 3,898,784
DATED : August 12, 1975
INVENTOR(S) : Gale E. Sauer and Conrad Christel It is certified that error appears in the above-identified patent and that said Letters Patent are hereby corrected as shown below:

Claim 3, Line 2, "for each" should be --in each--.

Claim 2, Line 4, "for" should be --in--.

Signed and Sealed this fourth Day of November 1975

[SEAL]

Attest:

RUTH C. MASON
Attesting Officer

C. MARSHALL DANN
Commissioner of Patents and Trademarks